United States Patent [19]

Yoon

[11] Patent Number: 5,187,700
[45] Date of Patent: Feb. 16, 1993

[54] APPARATUS FOR LOADING DISC RECORDS OF DIFFERENT SIZE IN A COMPACT DISC PLAYER

[75] Inventor: Seok Y. Yoon, Kyungki, Rep. of Korea

[73] Assignee: Goldstar Co., Ltd., Seoul, Rep. of Korea

[21] Appl. No.: 669,841

[22] Filed: Mar. 15, 1991

[30] Foreign Application Priority Data

Mar. 15, 1990 [KR] Rep. of Korea ............... 3050/1990

[51] Int. Cl.$^5$ .................. G11B 17/04; G11B 25/04
[52] U.S. Cl. ................... 369/75.1; 369/75.2; 360/99.06
[58] Field of Search ............. 369/75.1, 75.2, 270, 369/271; 360/104, 99.04, 99.05, 99.06, 99.07

[56] References Cited

U.S. PATENT DOCUMENTS

| | | | |
|---|---|---|---|
| 4,498,162 | 2/1985 | Schatteman | 369/77.1 |
| 4,969,140 | 11/1990 | Koiwa et al. | 369/75.2 |
| 5,016,236 | 5/1991 | Cho | 369/75.2 |

FOREIGN PATENT DOCUMENTS

| | | | |
|---|---|---|---|
| 58-169365 | 10/1983 | Japan | 369/75.1 |
| 58-218074 | 12/1983 | Japan | 369/75.1 |
| 59-87676 | 5/1984 | Japan | 369/75.1 |
| 59-107449 | 6/1984 | Japan | 369/75.1 |

*Primary Examiner*—Stuart S. Levy
*Assistant Examiner*—Joseph A. Rhoa

[57] ABSTRACT

A disc record loading apparatus for use in a compact disc player loads different size disc records. The loading apparatus has a door (2) rotatably attached under a main body of the player. Within the door are a pair of spaced rectangular openings. A disc housing (10) is provided with a housing body, a pair of spaced support columns (12) vertically formed at center portions of the housing body, a support beam and a folded rib. The disc housing is mounted on the door. When a smaller disc record, such as an 8 cm diameter disc (8D disc), is inserted into the apparatus, the pair of support columns on the disc housing will support an edge of the disc record. The support beam is positioned between the two support columns and will form therewith a slot for receiving a part of edge of the 8D disc record. On the other hand, when a larger disc record, such as a 12 cm diameter disc (12D disc) is loaded, the disc record will engage the two support columns and push them to rotate the housing body. The edges of the disc record will then engage the supports for the door. When the door is closed, the folded rib on the housing body contacts an inner surface of a front panel of the main body in loading the 12D disc record. This disc loading apparatus is simple in construction and inexpensive to manufacture.

9 Claims, 4 Drawing Sheets

APPARATUS FOR LOADING DISC RECORDS OF DIFFERENT SIZE IN A COMPACT DISC PLAYER

BACKGROUND OF THE INVENTION

The present invention relates generally to a disc loading apparatus for a compact disc player (C.D.P.) and, more particularly, concerns a disc loading apparatus for a compact disc player capable of loading disc records of different size, for example, 8 cm diameter disc (8 D disc) or 12 cm diameter disc (12 D disc).

A conventional disc loading apparatus for a compact disc player is disclosed in U.S. Pat. No. 4,498,162, entitled "Automatic Disc Loading Apparatus". Said conventional disc loading apparatus generally comprises a horizontal plate for receiving inserted disc records, spaced levers pivotally movable laterally outwardly from a first position straddling the center line of a horizontal path, means resiliently urging said levers toward each other, a pair of generally L-shaped stop members mounted on the horizontal plate straddling the center line in the horizontal path of an inserted small size record to locate the record in the centered position, and two elements actuated by outward movement of both the levers by a large size record for shifting the stop means out of the horizontal path to permit a large size record to move to the centered position.

In accordance with the conventional disc loading apparatus, the levers have a first position spaced sufficiently to engage an inserted disc record of either a small size or a large size and can be moved outwardly against the resilient element to guide a record of either size to a centered position. Therefore, the conventional apparatus can automatically guide and load different size disc records to playing positions centered on a disc drive.

However, such a conventional disc loading apparatus comprises a lot of parts resulting in a complex design and an increase in the cost of construction. Also, it is inconvenient to actuate the disc loading apparatus.

SUMMARY OF THE INVENTION

Accordingly, it is an object of the present invention to provide a disc loading apparatus for a compact disc player which has a disc housing secured rotatably to a door. The disc housing being rotated alternatively depending on a size of disc record received, for example, 8 D or 12 D disc.

It is another object of the present invention to provide a disc loading apparatus for a compact disc player which is simple and convenient in use and inexpensive in construction.

In accordance with the present invention, a disc record apparatus for a compact disc player for loading a disc record of different size, for example, 8 D or 12 D disc record comprising: a door being attached rotatably under a main body of the compact disc player for receiving the disc record thereon; a rotatable disc housing secured on said door, and alternatively rotating depending upon the size of a received disc record. Said door includes a pair of spaced rectangular openings formed thereon, and said disc housing comprises a housing body, a pair of spaced support columns vertically formed at center portions of said housing body for supporting an edge of a disc record of small size, a support beam positioned between said two support columns in order to form a slot for receiving a part of said edge of the disc record of small size, a folded rib formed resulting from being folded backward at a top of said housing body to contact, at an end thereof, with an inner surface of a front panel of said main body in loading a disc record of large size.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and further objects, and advantages of the present invention will be understood more completely from the following detailed description of presently preferred, but nonetheless illustrative, embodiments of the present invention, with reference to the accompanying drawings, in which.

DETAILED DESCRIPTION OF THE PREFERRED EMBODIMENTS

Figure 1:
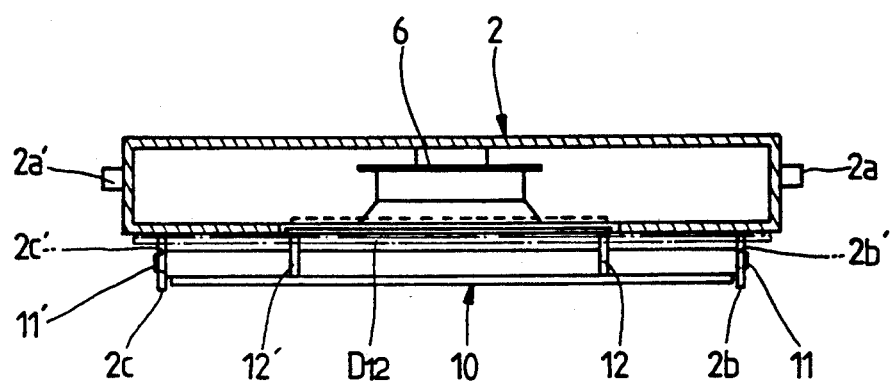
FIG. 1 is a cross-sectional view of an embodiment of a disc loading apparatus for a compact disc player in accordance with the present invention.
Figure 2:
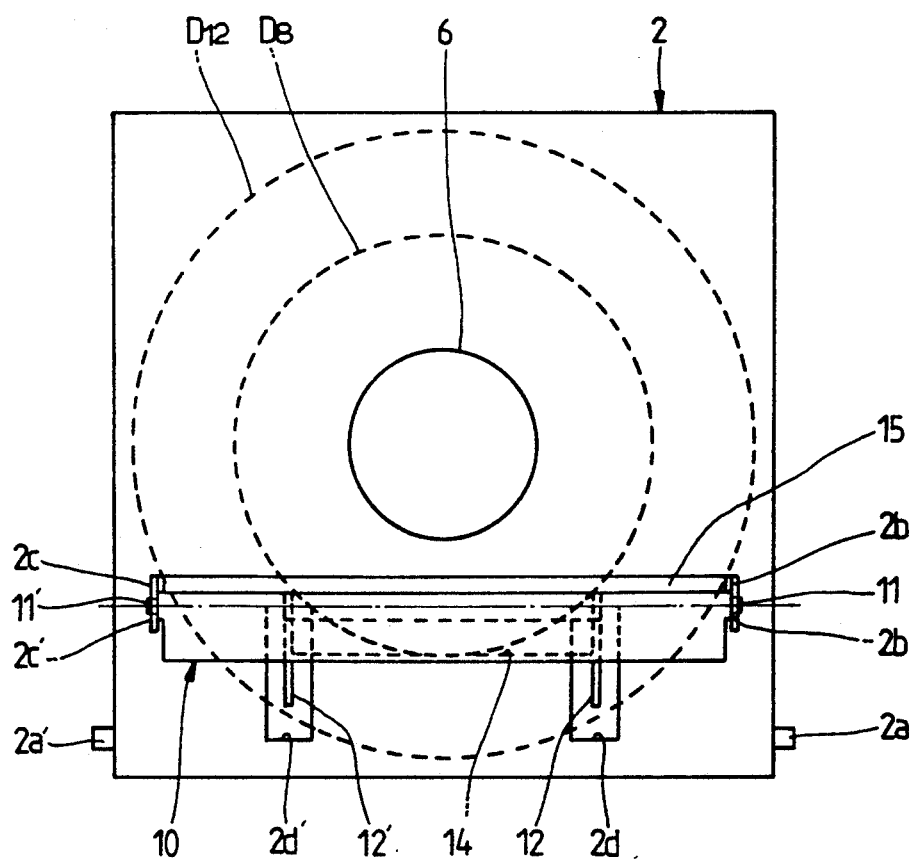
FIG. 2 is a top view of the disc loading apparatus of FIG. 1.
Figure 3:
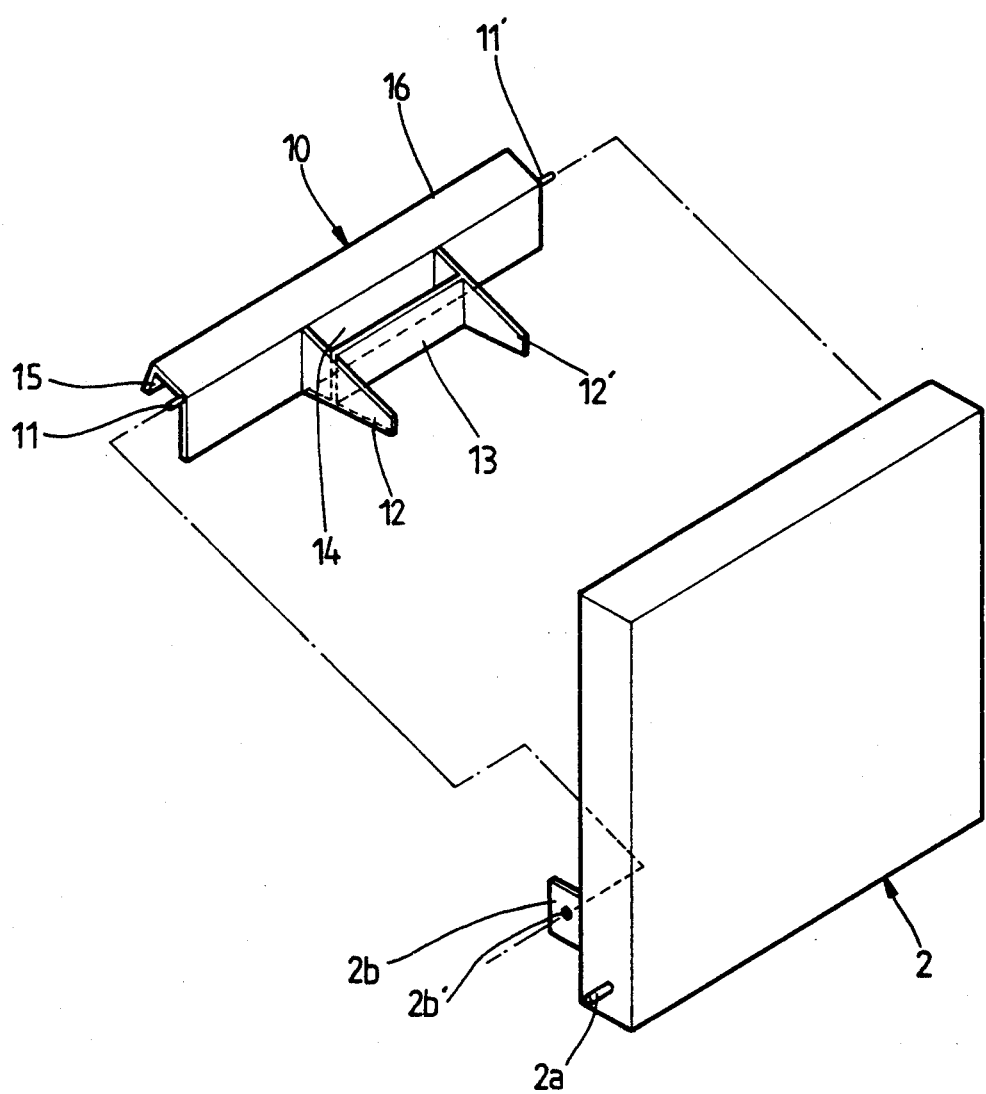
FIG. 3 is an exploded perspective view of the disc loading apparatus of FIG. 1.
Figure 4:
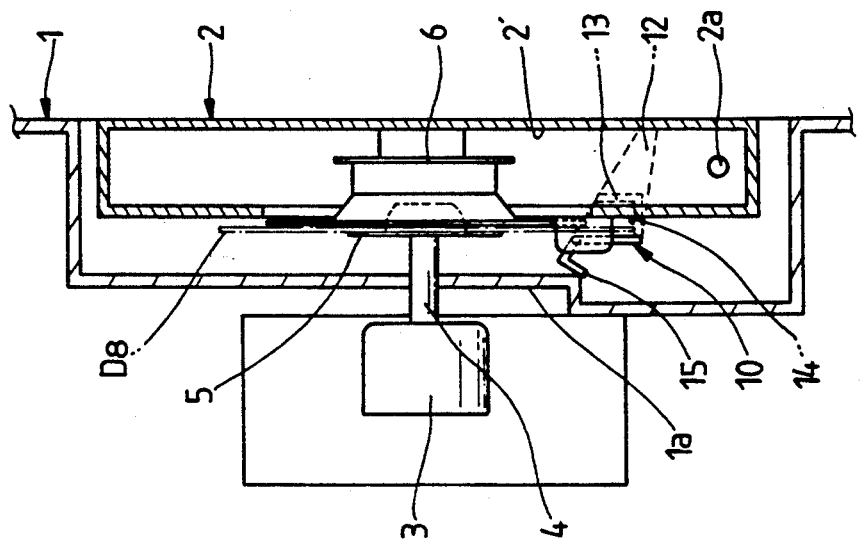
FIG. 4 is a longitudinal section view of a compact disc player with a disc loading apparatus in accordance with the present invention, in which the apparatus is opened, and an 8 D disc is inserted.

Turning now to the details of the drawings, FIGS. 1-7 illustrate a preferred embodiment of a disc loading apparatus for a compact disc player embodying the present invention. FIG. 1 is a cross-sectional view of a disc loading apparatus embodying the present invention. FIG. 2 is a top view of the apparatus shown in FIG. 1. FIG. 3 is an exploded perspective view of said apparatus, and FIG. 4 is a longitudinal section view of a compact disc player with said disc loading apparatus in which the apparatus is opened. In the drawings, the numerals 1 and 2 describe a main body of the compact disc player and a door respectively. Also, a pair of hinge pins 2a, 2a' are formed at the rear sides of the door 2. The hinge pins 2a, 2a' are inserted into a pair of holes formed, at positions corresponding to said pins 2a, 2a', on the main body 1 to permit rotation of the door 2 to be opened or closed.

The main body 1 comprises a front panel 1a and a drive motor 3 having a vertical spindle 4. Also, a turntable 5 being capable of loading 8 D disc or 12 D disc is secured at a lower end of the vertical spindle 4. The door 2 is provided with a magnet 6 to support a disc record in a similar method to the prior art.

On the other hand, a pair of spaced supports 2b, 2c are formed on the door 2. Each of said supports 2b, 2c has hinge holes 2b', 2c', and functions to support the 12 D disc on the door 2. Also, a pair of spaced rectangular openings 2d, 2d' are formed inside said supports 2b, 2c on the upper horizontal plate of the door 2.

Said hinge holes 2b', 2c' connected with a pair of hinge pins 11, 11', being formed outward at both sides of a disc housing 10 supporting a 8 D disc or a 12 D disc, in order to rotate the disc housing 10. Said disc housing 10 includes a housing body 16. Also, a pair of spaced support columns 12, 12' are fixed vertically to a center portion of the housing body 16. When a 12 D disc is received, the support columns 12, 12' rotate clockwise with the disc housing 10. The columns 12, 12' which are in the rectangular openings 2d, 2d' after the door 2 is opened and are in contact with an inner surface 2' of a lower horizontal plate of the door 2. A 8 D disc record can then be received in a slot 14 of housing body 16 as will be described below.

Also, a support beam 13 is positioned between the two support columns 12, 12'. The slot 14 is formed by the housing body 16, the support columns 12, 12' and the support beam 13. The slot 14 functions to receive a part of an edge of 8 D disc therein. A folded rib 15 is formed by folding a top of the housing body 16. The rib 15 contacts with an inner surface of the front panel 1a when a 12 D disc is loaded.

With respect to the operation of the disc loading apparatus in accordance with the present invention, it will be described in the following description with reference to the drawings, FIGS. 4 to 7.

Figure 5:
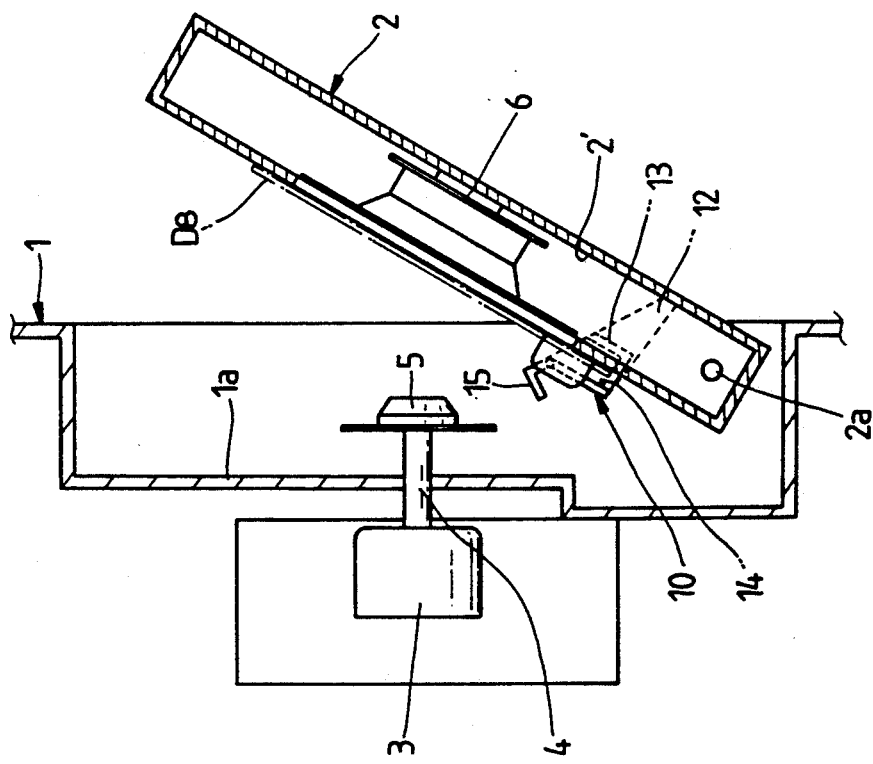
FIG. 5 is a longitudinal section view of the compact disc player of FIG. 4, in which the apparatus is closed.

FIGS. 4 and 5 illustrate an actuation of the disc loading apparatus when a disc record of small size, for example, 8 D disc record is loaded. When the disc loading apparatus is opened, the disc housing 10 rotates by the weight thereof. Thereby, the support columns 12, 12' enter the rectangular openings 2d, 2d' till the front portions of the columns 12, 12' contact with the inner surface 2' of the lower plate of the door 2 as shown in FIG. 4.

Thereafter, a 8 D disc record is loaded on the apparatus. A part of an edge of the 8 D disc record is received into the slot 14 because the size of the 8 D disc record is small. The apparatus is then closed with the disc housing 10 being rotated as above-mentioned resulting in the disc record being loaded to the turntable 5 of the main body 1. Also, the magnet 6 pushes the loaded disc record to the turntable 5 by magnetic force thereof in order to position the disc record in a centered position between the turntable 5 and the magnet 6.

The drive motor 3 drives the disc record and the turntable 5 in a method similar to the prior art.

Figure 7:
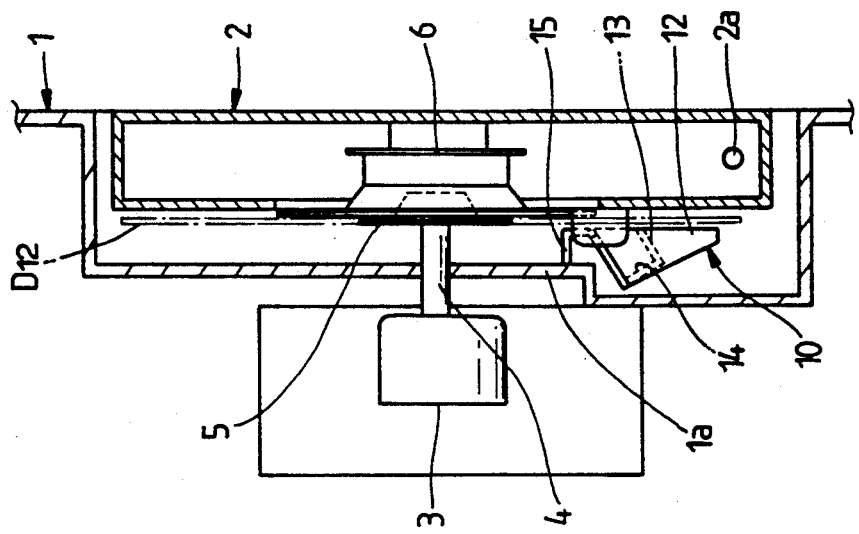
FIG. 7 is a longitudinal section view of the compact disc player of FIG. 6, in which the apparatus is closed.
Figure 6:
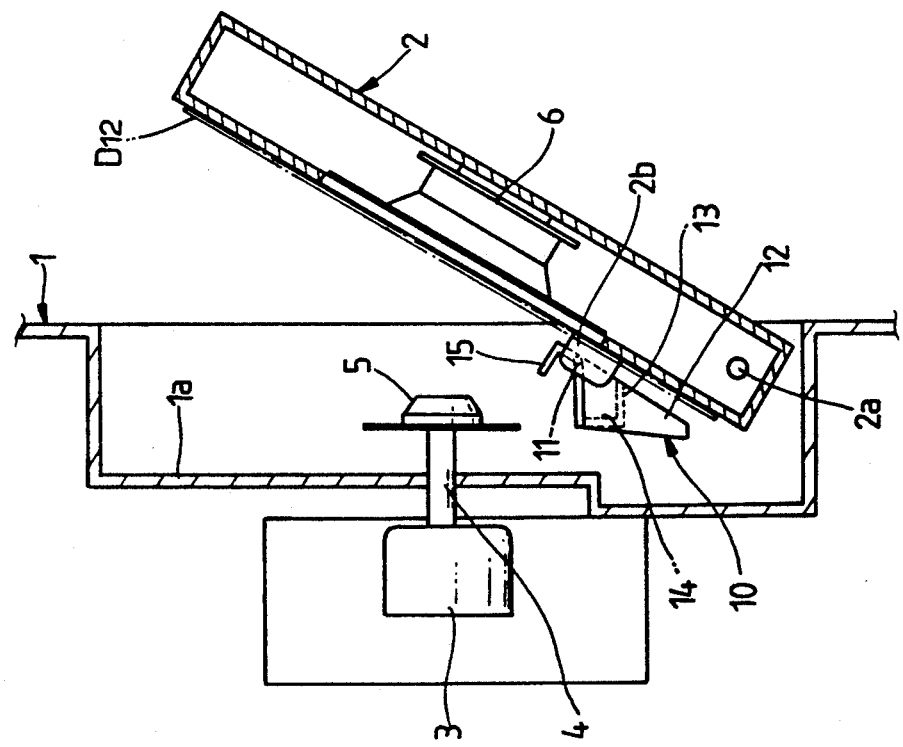
FIG. 6 is a longitudinal section view of the compact disc player of FIG. 4, in which the apparatus is opened, and a 12 D disc is inserted.

Also, FIGS. 6 and 7 illustrate an actuation of the disc loading apparatus when a disc record of large size, for example, 12 D disc record is loaded. The position that the disc loading apparatus 2 is opened, and the disc housing 10 rotates by the weight thereof as shown in FIG. 4 changes when a 12 D disc record is loaded (see FIG. 6). That is, the edge of the loaded 12 D disc record pushes backwardly the support columns 12, 12' from the position of FIG. 4 in order to rotate the disc housing 10 clockwise because the size of the 12 D disc record is large enough to push the support columns 12, 12'. At the above-mentioned rotated position of the disc housing 10, the edge of the disc record contacts with the supports 2b, 2c of the door 2.

When the disc record loading apparatus is closed, the disc record is pushed to the turntable 5 by the magnetic force of the magnet 6 to be in close contact with the turntable 5. Also, the front portion of the folded rib 15 contacts with the inner surface of the front panel 1a of the main body 1. Therefore, the disc record can be positioned in the centered position of the disc loading apparatus because the disc housing 10 is prevented from being moved.

As above described, the disc record loading apparatus for loading a disc record of different size, for example, 8 D or 12 D disc record in accordance with the present invention has a simple construction which comprises a door 2 rotatably attached under a conventional main body 1 of the compact disc player, and a disc housing 10 which has a housing body 16, a pair of support columns 12, 12', a support beam 13 and a folded rib 15. This housing 10 is rotatably secured on the door 2. Accordingly, the disc record loading apparatus according to the present invention is inexpensive to construct, and increases productivity.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A disc loading apparatus for use in a compact disc player, the disc loading apparatus loading a disc record into the compact disc player, the disc record being one of a small disc record and a large disc record, the disc loading apparatus comprising:

a door rotatably attached to a main body of the compact disc player, the disc record being received in the door;

a disc housing rotatably secured on the door between a first position and a second position; and means for rotating the disc housing from the first position to the second position depending on size of the disc record inserted, the disc housing being in the first position when a small disc record is inserted and being in the second position when a large disc record is inserted;

wherein the disc housing is rotated about a housing axis and wherein the door is rotated about a door axis, the housing axis and the door axis being generally parallel.

2. A disc loading apparatus for use in a compact disc player, the disc loading apparatus loading a disc record into the compact disc player, the disc record being one of a small disc record and a large disc record, the disc loading apparatus comprising:

a door rotatably attached to a main body of the compact disc player, the disc record being received in the door;

a disc housing rotatably secured on the door between a first position and a second position; and means for rotating the disc housing from the first position to the second position depending on size of the disc record inserted, the disc housing being in the first position when a small disc record is inserted and being in the second position when a large disc record is inserted, wherein the means for rotating the disc housing comprises a pair of spaced support columns attached to the disc housing and a beam extending between the columns, the disc housing having a housing body, a slot being defined by the disc housing, the pair of beams and the pair of support columns, an edge of a small disc record being received in the slot when the small disc record is inserted into the loading apparatus.

3. The disc loading apparatus in accordance with claim 2, wherein the pair of beams is engaged by an edge of a large disc record and moved such that the disc housing is moved from the first position to the second position when the large disc is inserted into the loading apparatus.

4. The disc loading apparatus in accordance with claim 3, wherein the pair of beams are spaced apart a predetermined distance, the predetermined distance enabling the edge of the small disc to be received in the slot.

5. The disc loading apparatus in accordance with claim 2, wherein the pair of beams are spaced apart a predetermined distance, the predetermined distance enabling the edge of the small disc to be received in the slot.

6. The disc loading apparatus in accordance with claim 2, wherein the pair of beams are generally parallel and are generally located in the center of the housing body.

7. The disc loading apparatus in accordance with claim 2, wherein the door has a pair of spaced openings defined therein, the pair of columns extending through the openings in the door before a disc record is inserted into the disc loading apparatus and when a small disc record is loaded in the disc loading apparatus, the columns being out of the openings in the door when a large disc record is loaded in the disc loading apparatus.

8. The disc loading apparatus in accordance with claim 2, further comprising a rib extending from the housing body, the rib contacting a front panel of the main body when a large disc record is inserted in the disc loading apparatus and when the door is closed.

9. The disc loading apparatus in accordance with claim 2, wherein the small disc record is a 8 cm diameter disc (8 D disc) and the large disc record is a 12 cm diameter disc (12 D disc).

* * * * *